(12) United States Patent
LaCount et al.

(10) Patent No.: US 8,440,015 B1
(45) Date of Patent: May 14, 2013

(54) FLY ASH CARBON PASSIVATION

(75) Inventors: Robert B. LaCount, Waynesburg, PA (US); John P. Baltrus, Jefferson Hills, PA (US); Douglas G. Kern, Point Marion, PA (US)

(73) Assignees: Waynesburg University, Waynesburg, PA (US); U.S. Department of Energy, Washington, DC (US)

( * ) Notice: Subject to any disclaimer, the term of this patent is extended or adjusted under 35 U.S.C. 154(b) by 195 days.

(21) Appl. No.: 12/803,306

(22) Filed: Jun. 23, 2010

Related U.S. Application Data

(63) Continuation-in-part of application No. 10/348,348, filed on Jan. 22, 2003, now abandoned.

(60) Provisional application No. 60/349,381, filed on Jan. 22, 2002.

(51) Int. Cl.
*C04B 18/06* (2006.01)

(52) U.S. Cl.
USPC ..................... 106/705; 106/DIG. 1

(58) Field of Classification Search .................. 106/705, 106/DIG. 1
See application file for complete search history.

(56) References Cited

U.S. PATENT DOCUMENTS

| | | | | |
|---|---|---|---|---|
| 4,948,429 A | * | 8/1990 | Arfaei | 106/659 |
| 5,160,539 A | * | 11/1992 | Cochran | 106/405 |
| 5,399,194 A | * | 3/1995 | Cochran et al. | 106/405 |
| 5,484,476 A | * | 1/1996 | Boyd | 106/405 |
| 6,136,089 A | | 10/2000 | Hurt et al. | |
| 6,391,105 B1 | * | 5/2002 | Oates et al. | 106/705 |
| 6,395,145 B1 | | 5/2002 | Altman | |

OTHER PUBLICATIONS

Dodson, Vance H., Concrete Admixtures, Chapter 6 Air Entraining Admixtures; Van Norstrand/Reinhold; New York, NY; 1990; pp. 135-155.

Baltrus et al.; Characterization of Carbon Concentrates from Coal-Combustion Fly Ash; Energy & Fuels, vol. 15 No. 2; American Chemical Society; 2001; pp. 455-462.

Freeman et al.; Interactions of carbon-containing fly ash with commercial air-entraining admixtures for concrete; Fuel, vol. 76, No. 8: Elsevier Science Ltd.; 1997; pp. 761-765.

(Continued)

*Primary Examiner* — Paul Marcantoni
(74) *Attorney, Agent, or Firm* — James Creighton Wray

(57) ABSTRACT

A thermal method to passivate the carbon and/or other components in fly ash significantly decreases adsorption. The passivated carbon remains in the fly ash. Heating the fly ash to about 500 and 800 degrees C. under inert gas conditions sharply decreases the amount of surfactant adsorbed by the fly ash recovered after thermal treatment despite the fact that the carbon content remains in the fly ash. Using oxygen and inert gas mixtures, the present invention shows that a thermal treatment to about 500 degrees C. also sharply decreases the surfactant adsorption of the recovered fly ash even though most of the carbon remains intact. Also, thermal treatment to about 800 degrees C. under these same oxidative conditions shows a sharp decrease in surfactant adsorption of the recovered fly ash due to the fact that the carbon has been removed. This experiment simulates the various "carbon burnout" methods and is not a claim in this method. The present invention provides a thermal method of deactivating high carbon fly ash toward adsorption of AEAs while retaining the fly ash carbon. The fly ash can be used, for example, as a partial Portland cement replacement in air-entrained concrete, in conductive and other concretes, and for other applications.

18 Claims, 6 Drawing Sheets

OTHER PUBLICATIONS

Gao et al.; Effects of Carbon on Air Entrainment in Fly Ash Concrete: The Role of Soot and Carbon Black; Energy and Fuels; vol. 11, No. 2; American Chemical Society; 1997; pp. 457-462.

Yu et al.; Adsorptive and Optical Properties of Fly Ash from Coal and Petroleum Coke Co-Firing; Energy and Fuels, vol. 14, No. 3; American Chemical Society; 2000; pp. 591-596.

Hill et al.; Investigation of fly ash carbon by thermal analysis and optical microscopy; Cement and Concrete Research, vol. 28, No. 10; Elsevier Sciences Ltd.; 1998; pp. 1479-1488.

Gao et al.; Ozonation for the chemical modification of carbon surfaces in fly ash; Fuel, vol. 80; Elsevier Science Ltd.; 2001; pp. 765-768.

LaCount et al.; Characterization of carbon in fly ash Using Controlled-Atmosphere Programmed-Temperature Oxidation (CAPTO); Proceedings of Third Annual Conf. on Unburned Carbon on Utility Fly Ash, Pittsburgh, PA; May 13-14, 1997; U.S.DOE; pp. 67-73.

LaCount et al.; Characterization of carbon forms in fly ash using controlled-atmosphere programmed-temperature oxidation (CAPTO); General Paper Preprints of Symposia, 216th ACS National Meeting: Aug. 22-27, 1998; pp. 995-999.

LaCount et al.; Treatment of high carbon fly ash to produce a low foam index product with carbon content retained; Proceedings of 14th International Symposium on Management and Use of Coal Combustion Products, vol. 1, EPRI; 2001; pp. 15-1-15-13.

Baltrus et al.; Measurement of adsorption of air-entraining admixture on fly ash in concrete and cement; Cement and Concrete Research, vol. 31; Pergamon Press; 2001; pp. 819-824.

LaCount et al.; Treatments for lowering foam index in high-carbon fly-ashes for concrete applications; Paper presented at session 46, 18th Annual International Pittsburgh Coal Conference; Newcastle, NSW, Australia; Dec. 3-7, 2001; 7 pages.

Havercroft et al.; Use of differential surface charging to separate chemical differences in x-ray photoelectron spectroscopy; Surface and Interface Analysis, vol. 29; John Wiley & Sons Ltd.; 2000; pp. 232-240.

Tielsch et al; Differential Charging in XPS. Part I: Demonstration of Lateral Charging in a Bulk Insulator Using Imaging XPS; Surface & Interface Analysis, vol. 24; John Wiley & Sons Ltd.; 1996; pp. 422-427.

Fiedor et al.; Determination of Molybdenum Oxidation States in reduced Mo/TiO2 Catalysts by factor analysis and curve fitting; Surface and Interface Analysis, vol. 20, No. 1; John Wiley & Sons Ltd.; 1993; pp. 1-9.

Fiedor et al.; Study of the Reduction Behavior of W/TiO2 Catalysts by XPS using Curve Fitting, Deconvolution and Factor Analysis; Surface & Interface Analysis, vol. 23; John Wiley & Sons Ltd.; 1995; pp. 204-212.

* cited by examiner

FLY ASH CARBON PASSIVATION

This is a continuation-in-part of U.S. application Ser. No. 10/348,348, filed Jan. 22, 2003 now abandoned, which claims the benefit of U.S. Provisional Application No. 60/349,381, filed Jan. 22, 2002.

BACKGROUND OF THE INVENTION

This application claims the benefit of U.S. Provisional Application No. 60/349,381, filed Jan. 22, 2002.

Commercially, fly ash is often used as a replacement for some of the Portland cement in concrete products. Surfactants, used to entrain air in the concrete mixtures, improve the workability of the mixtures and the durability of the concrete products to freeze-thaw cycles (Dodson, 1990).

Inefficient combustion and the use of low-$NO_x$ burners in coal-fired boilers have resulted in variable increases in the unburned carbon content of fly ash (Baltrus et al., 2001). When high-carbon fly ashes are used in concrete, an increase in the amount of surfactant may be required, because carbon absorbs the expectant surfactant in concrete mixtures. Variations in carbon content and amount of surfactant required directly impact the sale of fly ash for use with cement to produce concrete products. Even when fly ash meets loss on ignition (LOI) specifications, variation in the adsorption properties of the fly ash may result in changes in the amount of surfactant required (Freeman et al., 1997). The foam index (FI) test is used to determine the amount of surfactant required in the concrete. The FI test involves titration of a portion of the concrete mixture with an aqueous solution of surfactant until a stable foam results.

Factors affecting air entrainment in the concrete mixtures have been identified. For example, as the carbon content of the pozzolans increase, the level of entrained air decreases (Dodson, 1990). Freeman et al. (1997) examined the interactions of carbon-containing fly ash with surfactants and found that the interactions are time dependent and that the degree of interaction correlates only roughly with carbon content.

Gao et al. (1997) examined the interaction between several fly ash carbons and carbon blacks and an air-entraining admixture (AEA) and found that surfactant interaction increases with an increase in carbon surface area. Yu et al. (2000) found that a low specific area fly ash containing 17 wt % carbon produced by co-firing coal and petroleum coke had no measurable surfactant adsorptivity. Hill et. al. (1998) examined a number of fly ash samples using thermal and optical microscopy methods. They found that differential thermal analysis was not a useful prognostic tool for performance of fly ash in air-entrained mortar. Additionally, optical characterization of the forms of carbon in fly ash did not relate fly ash performance to mortar air entrainment, but it did indicate that a significant portion of carbon in fly ash is sub-micron in size. They also found that potential effects of carbon chemistry on surfactant adsorption capacity cannot be identified using surface areas determined with an inert gas such as nitrogen. Gao et al. (2001) reported ozonation for chemical modification of the carbon surfaces in fly ash as a route to reducing the adsorptivity of fly ash carbon toward surfactants.

One approach for characterization of fly ash carbon is to focus on partial oxidation to selectively remove each carbon form followed by characterization of the carbon form or forms remaining in the fly ash residues. LaCount et al. (1997), using this approach, characterized the carbon in several fly ash samples using a controlled-atmosphere programmed-temperature oxidation (CAPTO) instrument and found oxidation generally occurring in four different temperature zones. Several of the oxidation temperatures are well above those of coals, activated carbons, and other chars but significantly below the oxidation temperature of graphite. The amount of carbon dioxide evolving in each temperature range was evaluated. That work prompted progressive partial oxidation and pyrolysis studies of numerous fly ash samples followed by foam index (FI) measurements to assess any change in surfactant adsorption properties of each partially oxidized or pyrolyzed residue (LaCount et al., 1998 and 2001). A major decrease in FI occurred between room temperature and approximately 400° C. prior to significant loss of carbon.

Baltrus et al. (2001) optimized an ultraviolet-visible spectrophotometric method for measuring the adsorption of air-entraining surfactants on the components of cement. It was found that FI was a poor means for measuring adsorption capacity in high carbon fly ashes due to an insufficient equilibration time used in the foam index measurements.

A better understanding of the variation in interactions of air entraining surfactants with unburned carbon forms and the mineral components in fly ash concrete mixtures may lead to improved methodology for maintaining the level of air as the concrete cures. A better prediction of surfactant performance with different fly ash samples may help to minimize variability in concrete products.

SUMMARY OF THE INVENTION

The present invention relates to a thermal method to deactivate/passivate the carbon and/or other components in fly ash towards adsorption of air-entraining agents (AEAs)/surfactants. The deactivated carbon remains in the fly ash and the present method departs from previous methods based upon partial or complete removal of the carbon.

Heating the fly ash to about 500 to 800 degrees C. under inert gas conditions sharply decreases the amount of surfactant adsorbed by the fly ash recovered after thermal treatment despite the fact that the carbon content remains in the fly ash.

Using oxygen and inert gas mixtures, the present invention shows that a thermal treatment to about 500 degrees C. also sharply decreases the surfactant adsorption of the recovered fly ash even though most of the carbon remains intact. Also, thermal treatment to about 800 degrees C. under these same oxidative conditions shows a sharp decrease in surfactant adsorption of the recovered fly ash. Of course, this last result is not unexpected because oxidation of the fly ash at these temperatures completely oxidizes the carbon out of the fly ash. Numerous "carbon burnout" methods are already operational based upon oxidizing the carbon out of fly ash.

The present method uses spectroscopic and conductivity measurements to show that while the thermal treatment deactivates the fly ash adsorption towards AEAs, the carbon content remains essentially unchanged.

The present invention provides a method of treating fly ash from low temperature, low NOx coal burning power generation for use as a partial Portland cement replacement in air-entrained concrete. The untreated fly ash is removed from a coal combustion flue and transported to a heat treatment facility. The untreated fly ash is heat treated from about 400 to 500° C. The result of the heat treatment is the finished fly ash. This thermally treated fly ash is then provided, for example, to concrete plants for combination with Portland cement, surfactant, water and aggregate to form air entrained concrete for road construction or other uses such as the production of conductive concrete for diverse applications.

In a preferred embodiment, the untreated fly ash has up to 6% carbon content by volume for use to produce concrete for roads and carbon content of 12% or higher to produce conductive concrete for diverse applications. The heat treatment is conducted at temperatures from about 400 to 500° C., and more specifically at about 450° C. The heat treated fly ash uses less surfactant to produce a stabilized foam.

The heat treatment can be conducted in air, a mixture consisting of 10% oxygen and the remainder inert gas, or in inert gas. The thermal fly ash treatment conducted in inert gas clearly shows that the decrease in the amount of surfactant required to produce a stable foam is not related to oxidizing away carbon to produce carbon dioxide since that will not occur in an inert gas.

The invention includes a heat-treated fly ash product produced by the above method. The heat treated fly ash product is created by taking untreated fly ash from a power generation system and heat treating the fly ash at temperatures from about 400 to 500° C. to produce a fly ash with reduced propensity for adsorption of surfactant when combined with the surfactant and water. Less surfactant is required to produce a stabilized foam when thermally treated fly ash is used instead of the non-thermally treated fly ash to replace a portion of the cement in a concrete mixture.

The present invention provides a passivated/deactivated fly ash that requires less surfactant to produce, for example, an air entrained concrete product produced by combining aggregate, water, Portland cement, heat-treated fly ash and surfactant. The heat-treated, carbon containing fly ash can replace up to about 20% of the Portland cement in the concrete mixture. Some fly ash may contain 15-20% carbon. High carbon thermally treated fly ash may be used in the preparation of conductive concrete where 20-35% carbon maybe required to achieve the proper electrical conductivity.

In another preferred embodiment of the present invention, the untreated fly ash is heat-treated in the absence of oxygen at temperatures of about 100 to 800° C.

These and further and other objects and features of the invention are apparent in the disclosure, which includes the above and ongoing written specification, with the claims and the drawings.

Figure 1:
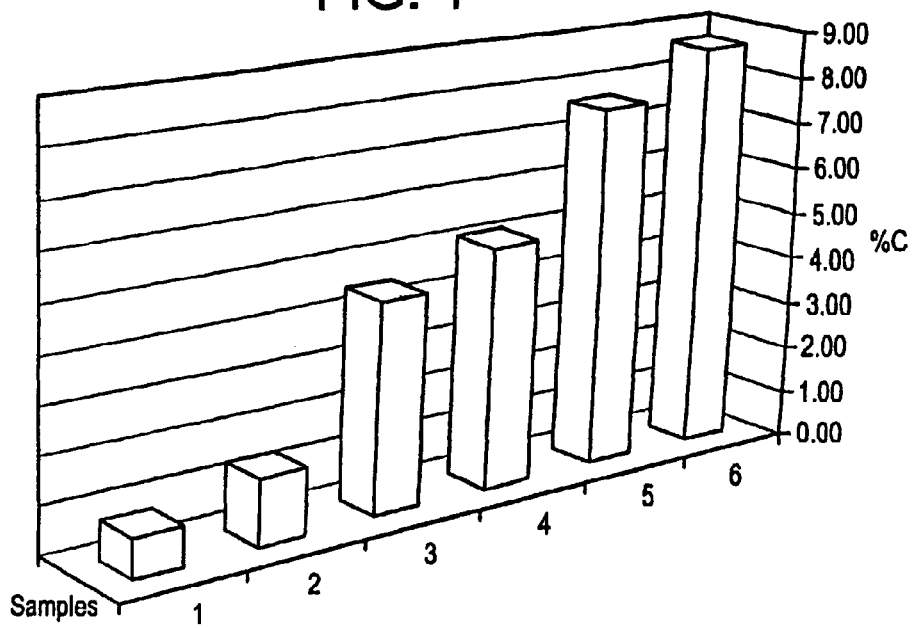
FIG. 1 is a graph of the carbon percentage for the six fly ash samples selected for the present study.

Table 1 is a summary of fly ash concrete test results.

Table 2 is a list of conductance for fly ash samples, untreated and after pyrolysis.

Table 3 is a list of conductance for thirteen fly ash samples, untreated and after pyrolysis.

DETAILED DESCRIPTION OF THE PREFERRED EMBODIMENTS

The initial goal of the present work was to thermally treat commercially important fly ash samples under both oxidative and inert conditions as a route to decrease surfactant adsorption by the fly ash. In order to evaluate the effectiveness of the thermal treatments in lowering surfactant adsorption, both the untreated and thermally treated samples were characterized using both FI, and conductance measurements.

A complete temperature range was tested up to over 800° C., the approximate temperature where carbon forms are completely removed from fly ash. After each partial oxidation the thermally treated fly ash was characterized for the carbon forms remaining using CAPTO. A foam index test was also performed to determine if any one form of carbon was more responsible for fly ash adsorbing the surfactant that is placed in the mix to entrain air in the concrete. Adsorption of the surfactant by carbon in the fly ash causes the concrete to lose entrained air as it hardens. This decreases the durability of the concrete to freeze and thaw cycles. The freezing moisture has little or no air space available for expansion and the concrete cracks.

In initial work, it was found that the amount of surfactant required to obtain a foam (foam index test) with the recovered, thermally treated fly ash samples decreased as the fly ash samples were heated to increasingly higher temperatures. A significant decrease in the foam index test results occurred at about 400 to 500° C. well before the temperature was high enough to oxidize away a significant fraction of the carbon forms that were present in the untreated fly ash. As the fly ash samples were heated and oxidized at increasingly higher temperatures, the foam index showed a significant further decrease. This was understandable since the carbon in the fly ash was being oxidized/burned out of the fly ash at these higher temperatures, about 800° C. Several methods for upgrading fly ash involve oxidation of the carbon forms from the fly ash and thus permit the treated fly ash to be used commercially. The present invention centers on the significant decrease in foam index test results at thermal oxidation temperatures prior to any significant loss of carbon.

To further understand the results, increasingly higher temperatures were used on the fly ash, but inert gas conditions were used instead of oxidative conditions. A significant decrease in foam index results is noted in these cases where the carbon has clearly been retained in the thermally treated fly ash samples. Thus, some change in the carbon and/or fly ash components occurs to cause this decrease in foam index under oxidative conditions before the temperature has reached the point where the carbon is oxidized from the sample. A change also occurs in the thermal treatment under inert gas conditions where the carbon in retained in the sample even at temperatures of about 800° C.

The spectroscopic and conductance work that was completed has been described herein. It characterizes the thermally treated samples to show that changes did occur in the fly ash samples under these thermal treatments where the carbon present in the untreated fly ash remained in the thermally treated samples. The XPS and conductance methods provide support that changes are occurring in the fly ash samples during thermal treatments when the carbon is retained in the fly ash. Conductance tests show a reduction of conductivity in the fly ash containing carbon after heat treatment in air to about 400 to 500° C.

The overall objective of this work is to develop a method that will decrease the interaction between fly ash and the surfactants used to entrain air in concrete products, thus increasing the amount of fly ash suitable for use in concrete products. Thermally treated fly ash samples that have a decreased interaction with air entraining surfactants, as evidenced by a significantly lower FI value, were prepared in quantities suitable for the preparation of concrete test samples. Concrete test samples prepared from these thermally treated fly ashes were evaluated for the amount of entrained air as well as compressibility. The data was compared to concrete test samples prepared using the same fly ashes without treatment.

Previously (LaCount et al., 2001) two different fly ash samples derived from eastern bituminous coals had been thermally treated under both oxidizing and inert conditions to a range of temperatures from about 100 to 769° C. and each residue characterized using CAPTO, and FI. The CAPTO results indicated the presence of at least four different carbon forms in the untreated fly ash samples. In all cases, a decrease in FI values was observed. A significant decrease in the FI values occurred prior to significant loss of carbon indicating that factors other than carbon content may play a role in determining a sample's FI. In order to identify those factors, the thermally treated fly ash residues were examined by X-ray photoelectron spectroscopy (XPS), X-ray diffraction (XRD), scanning electron microscopy (SEM), and petrographic analysis. XPS has previously been used to distinguish the presence of various graphitic (LaCount et al., 2001) carbon types in the untreated fly ash. The types of carbon were found to vary as a function of oxidation temperature. All of the bulk carbon was removed by oxidation to about 769° C. SEM measurements of the untreated and oxidized fly ash samples showed no change in morphology of the ash after oxidation. Petrographic analysis showed no difference in carbon anisotropy at the various temperatures prior to the complete oxidation of carbon.

To ensure that the decrease in foam index observed above was applicable to other fly ashes, a series of 13 different fly ashes derived from eastern bituminous coals were thermally treated to about 500 and 800° C. under both oxidative and inert conditions and characterized using FI and conductance (LaCount et al., 2001). In all cases the FI values of the thermally treated fly ash samples were lower in comparison to those of the untreated samples. Additionally, the conductance of samples thermally treated to about 800° C. under inert conditions was found to be lower than that of the untreated fly ash samples indicating that the thermal treatments may lessen the solubility of ions that can interfere with the surfactant in the FI measurement.

Based on the previous observations described above that FI values of thermally treated fly ashes are significantly lower than those of untreated fly ash samples, an additional series of six commercially important fly ash samples were subjected to similar thermal treatments using CAPTO or a larger sample treatment vessel and furnace and the resulting treated fly ash used for further study of the relation between FI, conductance, and thermal treatments. Each untreated fly ash was used to generate quantities of thermally treated fly ash required for the preparation and testing of concrete samples. The concrete test results are shown in Table 1.

The concrete test data was obtained using a concrete minimix and the results computed for comparison to a full size mix. The minimix trial mix procedure is conducted with the exclusion of the coarse aggregate, thus reducing the amount of materials needed, as well as reducing the number of variables. Sand and water were adjusted as necessary to maintain the intended yield and the desired slump. The water/cement ratio was about 0.50. Water requirement to achieve a target slump (4 inches +/−) was not affected by the fly ash beneficiation treatments. Fly ash replaced approximately 20% of the cementaceous material in the concrete mixture and the water/cement ratio was approximately 0.50.

The percent air entrainment as well as the 3, 7, and 28-day compressibility test results are shown in Table 1. The average air entrainment of the concrete test samples prepared using untreated fly ash samples was 5.92%; 5.87% for test samples prepared using fly ash treated to 500° C. and 5.73% for samples prepared using fly ash treated to about 800° C. The compressibility tests results were completed at 3, 7, and 28 days using 2" test cylinders and the average values are in or above the expected range for an air entrained product with a water/cement ratio of 0.50. The results show very little or no difference in strength performance as a function of beneficiation of the ash.

CAPTO: All Fly ash samples were characterized using CAPTO. The carbon forms and total carbon content were determined from the overall $CO_2$ evolution profiles. A 250 mg sample of each fly ash was thoroughly mixed with 12 g of tungsten trioxide and positioned in a quartz combustion tube to ensure gas plug flow through the sample. A 100 $cm^3$ $min^{-1}$ flow of gas (10% oxygen/90% argon or 100% argon) through the sample was maintained as the combustion tube was heated from room temperature to 1050° C. at a temperature ramp of 3° C. $min^{-1}$. The resultant $H_2O$, $CO_2$ and $SO_2$ evolution gases, are swept from the combustion tubes through a secondary furnace, maintained at 1050° C. to ensure complete oxidation and consistent temperature/equilibrium conditions, into FTIR gas cells. An FTIR was used to measure the distinctive $H_2O$, $CO_2$, $SO_2$ patterns evolving from the sample. Integration of the gas evolution patterns provided the forms and total hydrogen, carbon, and sulfur content of the sample.

Thermal Treatment Methods: Six fly ash samples of commercial importance were selected for oxidization and pyrolysis to 500 and 800° C. in quantities suitable for the preparation of concrete test samples. The carbon content of two of the samples was between 7-9%; two contained between 4-6% carbon; and two contained between 0-2% carbon.

Two fly ash samples, "A" and "B", were selected for oxidization and pyrolysis to 100, 200, 403, 535, 637, and 769° C. Thirteen fly ash samples were oxidized and pyrolyzed to 500 and 800° C. FI measurements were completed in duplicate using 2 g samples of the residue recovered from each oxidation or pyrolysis experiment.

Thermal treatment of fly ash samples for Foam Index measurements was accomplished using CAPTO with 5 g samples of fly ash positioned in quartz combustion tubes. Oxidation treatments were completed using 10% oxygen/90% argon, and the pyrolysis treatments were completed using a 100% argon gas stream. The residues were then recovered from the combustion tubes and FI measurements were completed. Thermal treatments of larger quantities of fly ash required for concrete test samples were completed using a batch sample vessel and furnace under the same flow and thermal treatment conditions noted above.

Foam Index: FI measurements were completed in duplicate using representative samples of the residue recovered from each oxidation or pyrolysis experiment as well as the untreated fly ash samples. A modification of the FI test described by Dodson, 1990; Gao et al. 1997, and others was used. Two grams of each untreated or thermally treated fly ash sample was mixed with 5 mL of distilled water in a 15 mL i.d. 24 mm×45 mm vial, and shaken for 1 min. A mixture of Darex® II surfactant (W.R. Grace & Co.) in distilled water (1:40) was added to the mixture in 0.05 mL increments using a 2 mL microburet. The vial was shaken for 15 s, placed upright, opened, and the center portion of the foam layer observed using a microscope light source positioned at the side of the vial above the fly ash and below the foam layer. Stable foam that persisted for 15 s. and obscured all but a small fraction of light transmitted at the center of the foam layer was designated as the endpoint.

Conductance: Conductance measurements were performed to determine the relative solubility of conductive ions in a number of the fly ash samples before and after pyrolysis. The measurement was carried out by placing 0.1 g of fly ash in a 100 mL beaker to which 25 mL of deionized water was added along with a Teflon-coated stirring bar. The solution was stirred for 10 minutes and filtered. The filtrate was then tested using a conductance meter.

XPS: The X-ray photoelectron spectroscopy (XPS) analysis was carried out using a PHI 5600ci instrument. Monochromatized Al Kα (1486.6 eV) X-rays were used at a power of 400 W, and the analysis chamber was typically maintained at <$5 \times 10^{-9}$ Torr. The pass energy of the analyzer was 5.85 eV. For charge neutralization, the Emission Control was set at 20.5 and the Energy % was set at 11 for all samples.

XRD: X-ray diffraction (XRD) patterns were obtained with a computer-controlled diffractometer equipped with a long fine-focus copper X-ray tube, a diffracted beam graphite monochromatic Cu Kα radiation and a scintillator detector. When collecting data, step-scans were made at 0.1° intervals.

SEM: Scanning electron microscope (SEM) images were recorded in the backscattered mode at various magnifications using an instrument with a tungsten filament. The fly ash samples were examined for possible qualitative changes in carbon anisotropy by reflected polarized light using a Zeiss Universal microscope and a 40× oil immersion objective lens. A gypsum plate (first order red) was used to show areas of anisotropy.

FIG. 1 shows the carbon content of the six fly ash samples selected for this study. Note that two low carbon content (0.81, 1.39%), two medium carbon content (4.49, 5.13%) and two higher carbon content samples (7.70, 8.69%) are included in the selection.

Figure 2:
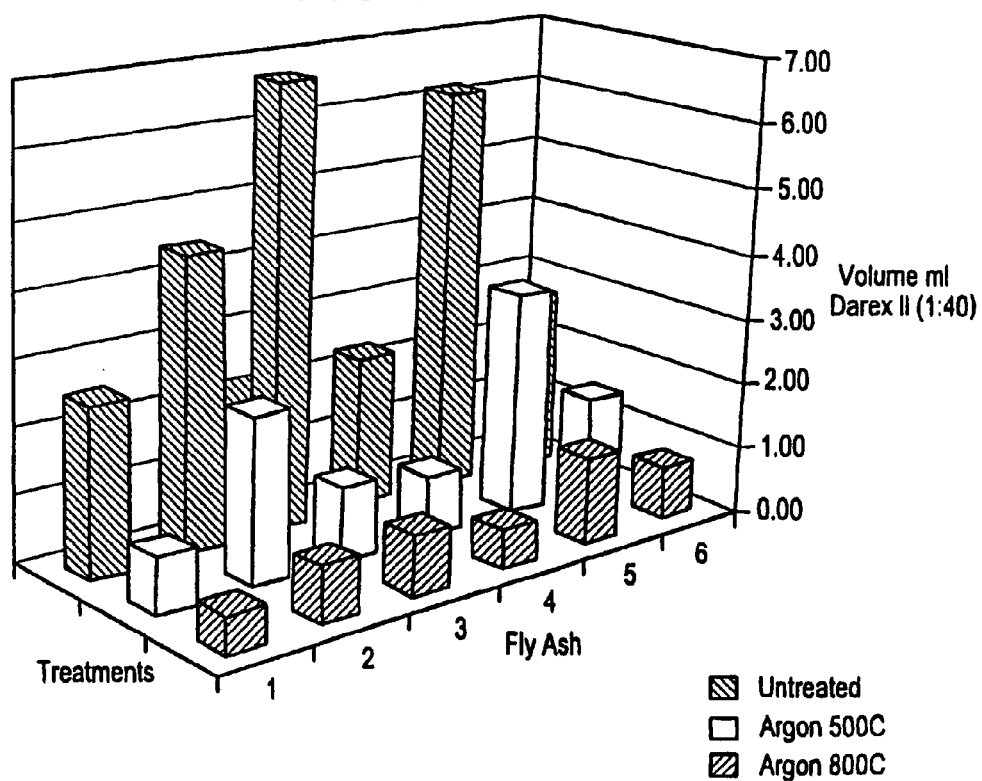
FIG. 2 is a graph of the foam index results of argon treatment for the fly ash samples selected for the present study.

The FI results for the fly ash samples treated under inert conditions to the two different temperatures are summarized in FIG. 2. Note that a significant decrease in FI resulted when the samples were treated to about 500° C. In all cases the fly ash samples thermally treated to about 800° C. under argon flow show an even lower FI value. These lower FI values are observed even though the carbon content during this thermal treatment is retained.

Figure 3:
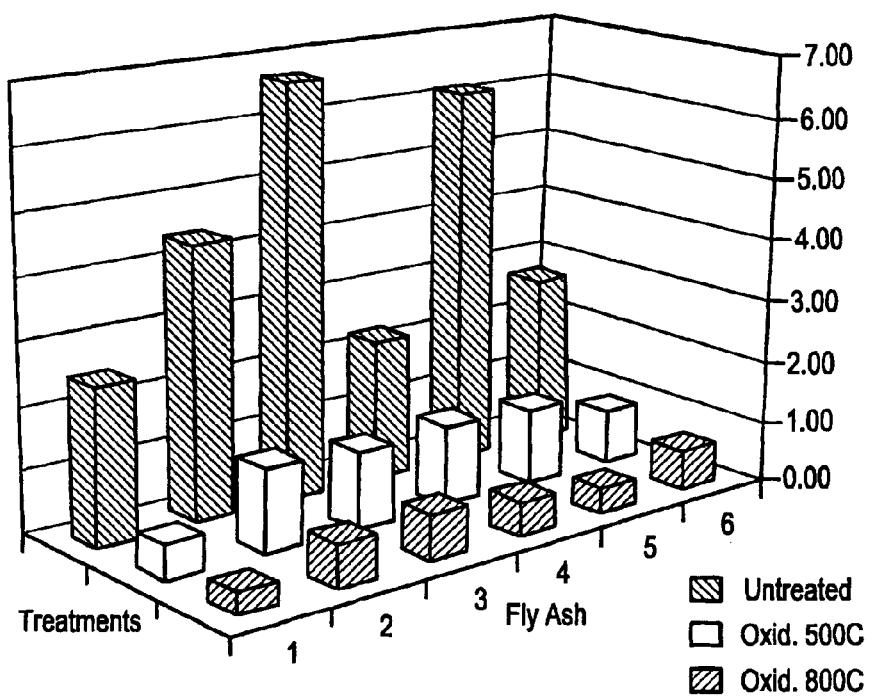
FIG. 3 is a graph of the foam index results of oxidative treatment for the fly ash samples selected for the present study.

The results of oxidative thermal treatment are shown in FIG. 3. Note that the same trend observed in FIG. 2 is retained in this plot. However, samples 2 and 5 show a further significant decrease in FI under oxidative thermal treatment to 500° C. compared to the thermal treatment under argon flow. Additionally, sample 5 in FIG. 3, treated to 800° C. under oxidative conditions, also shows a further significant decrease in FI compared to the corresponding treatment under argon flow as might be expected since carbon has been removed by oxidation at this temperature. Only three of the oxidized samples showed significantly lower FI values compared to the FI values obtained from thermal treatment under argon flow where carbon is retained.

Darex® II, the surfactant used in the FI titrations reported here, is an alkaline solution of fatty acid salts, and the surfactant properties of such "soaps" are affected by alkaline earth ions such as calcium and magnesium. Any affect that thermal treatment may have on the solubility of such ions in solution was determined by measuring the conductance of solutions exposed to the untreated and treated fly ashes.

Conductance results are shown in Table 2. Note that the conductance is lower in all cases after thermal treatments under inert conditions. However, the magnitude of the decrease shows no apparent correlation with changes in FI. This may be due to the fact that conductance is also affected by ions other than calcium and magnesium that have no effect on the surfactant. The decrease in conductance is probably due to incorporation of some of the previously soluble ions into insoluble structures induced by thermal treatment. However, the thermal treatment likely does not render all of the calcium and magnesium insoluble.

These experiments indicate that both unburned carbon and soluble ions such as calcium and magnesium can have an impact on FI. Their relative effects are most likely dependent on the properties of the carbon and mineral components of the fly ash and not their relative proportions in the ash.

Thermal treatment of the fly ashes under oxidative as well as inert atmosphere conditions clearly has an impact on FI. Conductance measurements of fly ash thermally treated under inert conditions does suggest a decrease in the solubility of ions that can interfere with the surfactant in the FI test, thus lowering the FI values. The ions that are rendered insoluble may be incorporated into amorphous "glass like" phases.

We are continuing to examine the effects of thermal treatment at other temperatures and other possible modes of surfactant adsorption by fly ash.

Figure 4:
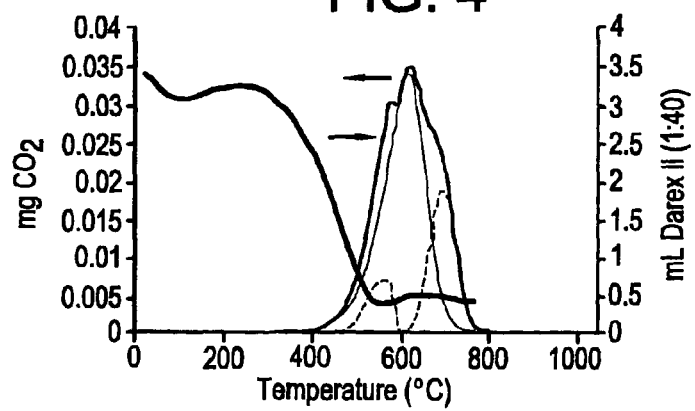
FIG. 4 is an evolution profile of fly ash A after oxidation to about 1050° C.
Figure 5:
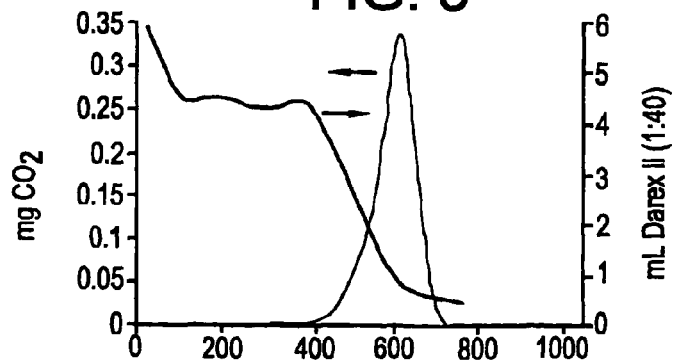
FIG. 5 is an evolution profile of fly ash A after oxidation to about 1050° C.

The CAPTO approach for characterization of fly ash carbon focused on partial oxidation to selectively remove each carbon form followed by characterization of the carbon form or forms remaining in the fly ash residues. This oxidative/non-oxidative comparative thermal study first centered on two fly ash samples, A and B, produced when a Pittsburgh seam coal was burned in pulverized coal fired utility boilers equipped with low-$NO_x$ burners. The complete CAPTO $CO_2$ evolution profiles of fly ashes A and B oxidized to about 1050° C. are shown in FIGS. 4 and 5. Fly ash A produces a very low level $CO_2$ evolution over the about 250 to 400° C. range which is not readily apparent from the scale of the profile shown in FIG. 4. FIG. 4 also shows the functions that best fit the profile for fly ash A. This profile is typical of those produced from many other fly ash samples used to establish a temperature regime (about 100, 200, 403, 535, 637, and 769° C.) for progressive partial oxidation and pyrolysis studies. A series of samples of fly ash A and B were oxidized or pyrolyzed, each to a specific temperature, and the residues recovered. The degree of interaction of each residue with a surfactant was assessed by titration with a Darex® II solution using a modified FI test. These FI results are also plotted on FIGS. 4 and 5. The greatest decrease in FI was prior to significant loss of carbon indicating that factors other than carbon content may play a role in determining a sample's FI. In order to determine what these other factors may be, the thermally treated fly ash residues also were examined by X-ray photoelectron spectroscopy (XPS), reflected polarized light microscopy, X-ray diffraction (XRD), and scanning electron microscopy (SEM).

Raman analysis has shown that unburned carbon in fly ash from a coal-fired utility has a highly disordered graphite structure. A single graphitic carbon species, when analyzed by XPS, would yield a single C 1s peak at approximately 284.6 eV. However in some cases, multiple C 1s peaks may appear from a single carbon species because of a phenomenon called "differential charging" (Havercroft and Sherwood, 2000; Tielsch and Fulghum, 1996). When using a monochromatic X-ray source for XPS analysis, an electron flood gun is often used to simultaneously irradiate the sample in order to minimize differential charging.

For the fly ash samples used in this study, a monochromatic X-ray was employed for XPS analysis. The electron flood gun was operated in a non-conventional "dynamic" mode to actually increase the degree of differential charging, which allowed for better separation of the peaks that were attributed to "graphitic" carbon species that were in different electronic environments. The different electronic environments of the normally conductive carbon species are determined by degree of association between the carbon and the insulating ash.

Figure 6:
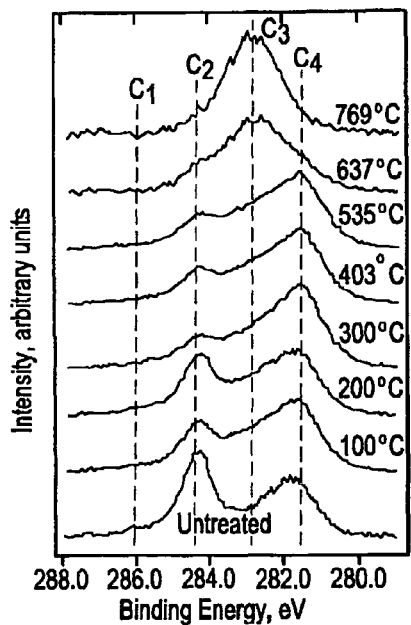
FIG. 6 is a graph of XPS C1s spectra of fly ash A as a function of oxidation temperature.

The variation in XPS C 1s spectra as a function of oxidation temperature for fly ash sample A is shown in FIG. 6. The series of raw spectra represented by dots in this figure were combined in a data matrix and processed using factor analysis to yield 4 principal component peaks ($C_1$-$C_4$) (Fiedor et al., 1993; Fiedor et al., 1995). The components were than combined in various proportions in an attempt to reconstruct the original data. The reconstructed data is represented by the solid curves. XPS provides supporting evidence for the carbon forms detected using CAPTO.

$C_1$ carbon is a minor component in all spectra and appears to be associated with $C_2$. $C_2$ is assigned to graphitic-like carbon that is free of the ash material. $C_3$ carbon is assigned to "adventitious" carbon that is adsorbed on the surface of the ash and is a common contaminant detected by XPS on solid surfaces exposed to air. $C_4$ carbon is assigned to insulated, unburned carbon that is in intimate contact with the ash.

Note that the relative peak intensity of $C_2$ carbon decreases with increasing oxidation temperature, while the relative peak intensity of $C_4$ goes through a maximum. At the highest oxidation temperature, the dominant peak is due to $C_3$.

Figure 6A:
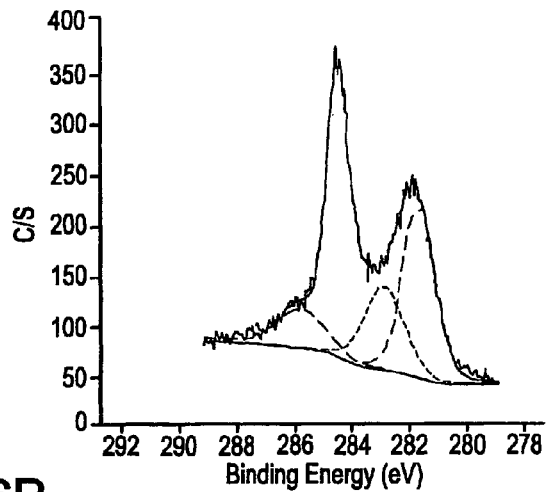
FIG. 6a is a graph of XPS C1s spectra of untreated fly ash A.
Figure 6B:
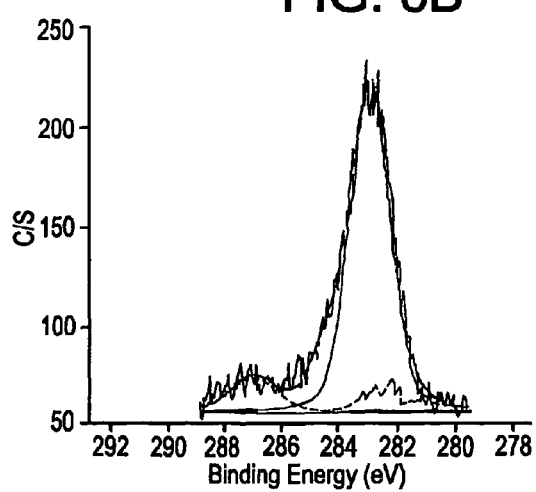
FIG. 6b is a graph of XPS C1s spectra of fly ash A oxidized to about 769° C.

Individual C 1s spectra of fly ash A were curve fitted using the peak parameters determined by XPS factor analysis to determine the relative peak areas, and thus the concentrations of the four carbon components. Typical results of the curve-fitting procedure are shown in FIGS. 6a and 6b.

The major peaks in the spectrum of the untreated fly ash are due to $C_2$, conductive carbon that is not in intimate contact with the ash, and $C_4$, insulated carbon that is in intimate contact with the ash. After the fly ash has been oxidized to about 769° C., the major form of carbon is the adventitious carbon ($C_3$), which is typically adsorbed on the surface of any sample exposed to air. This is consistent with elemental analysis, which shows that all of the bulk carbon is removed by oxidation to about 769° C.

Figure 7:
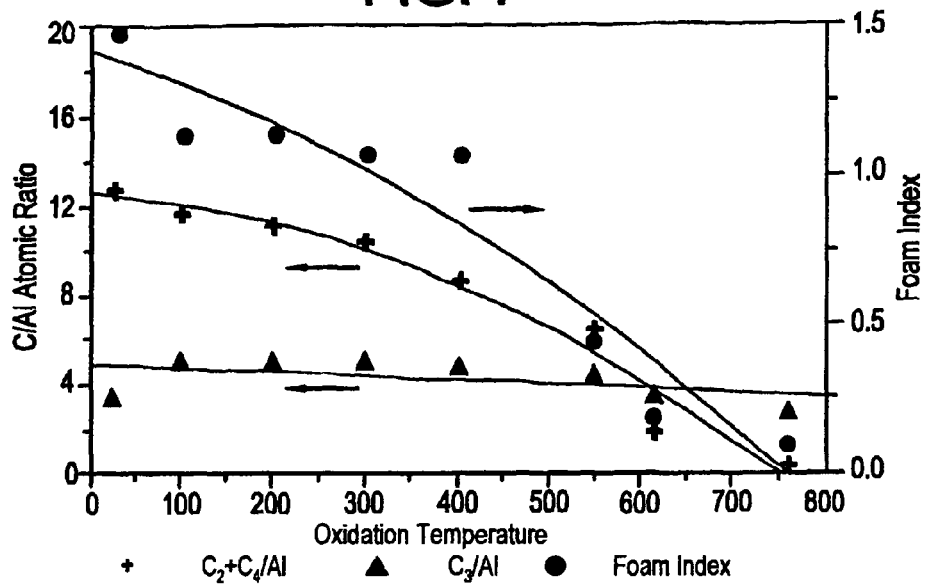
FIG. 7 is a graph of foam index and carbon forms a function of oxidation temperature.

The results of the curve-fitting analysis of the XPS C 1s spectra of fly ash A were used to determine the relative contributions of each carbon component to the overall surface C/Al atomic ratio. The resulting variation in carbon forms as a function of oxidation temperature is shown graphically along with the Foam Index of each sample in FIG. 7. The plot shows that a decrease in foam index can be correlated to a decrease in the amounts of surface carbon in the $C_2$ and $C_4$ forms. As expected, the amount of adventitious carbon remains relatively constant over the range of oxidation temperatures.

Figure 8:
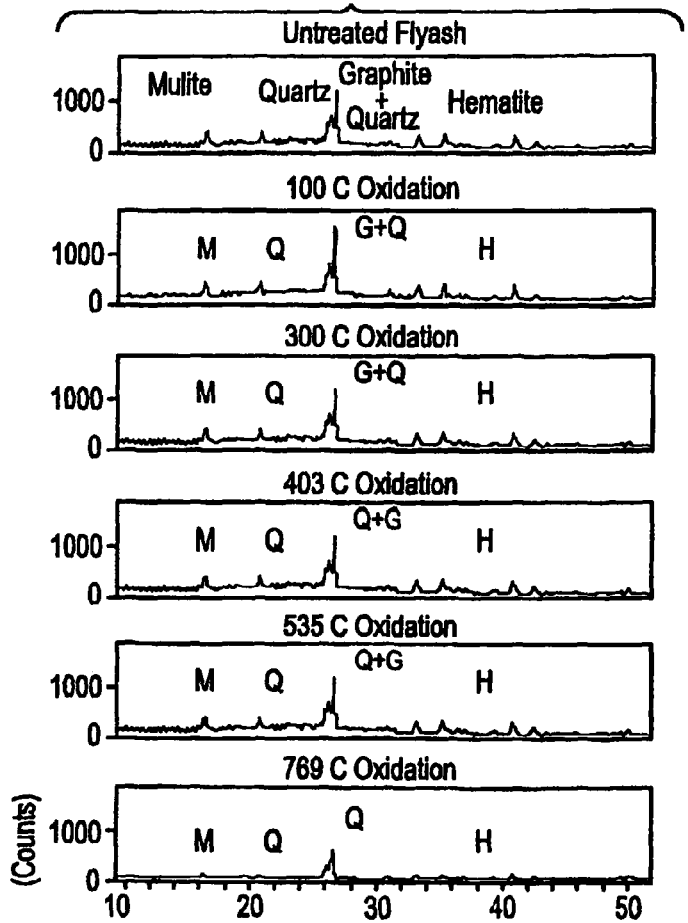
FIG. 8 is a graph of XRD patterns of fly ash A as a function of oxidation temperature.

The X-ray diffraction patterns as a function of oxidation temperature for fly ash A are shown in FIG. 8. The spectra show changes in carbon content as a function of oxidation temperature. These spectra show that graphitic carbon and amorphous carbon decrease as the oxidation temperature increases (note the change in the graphite+quartz peak and the decrease in the background intensity). For all of the samples examined, there was little change in the amount or crystallinity of the inorganic phases as a function of oxidation temperature.

SEM analyses of the untreated and oxidized A and B fly ashes showed no change in the morphology of carbon and the inorganic phases upon oxidation. Petrographic analyses showed areas of carbon anisotropy in all of the fly ash A samples except for the sample oxidized at 769° C., where all microscopically detectable carbon was burned off. The majority of the carbon was vitrinite-derived and contained some areas of anisotropy that appeared as white speckles. Part of the carbon was inertinite-derived and did not exhibit anisotropy. No difference in carbon anisotropy was observed at the various oxidation temperatures for either the A or B fly ash.

Figure 9:
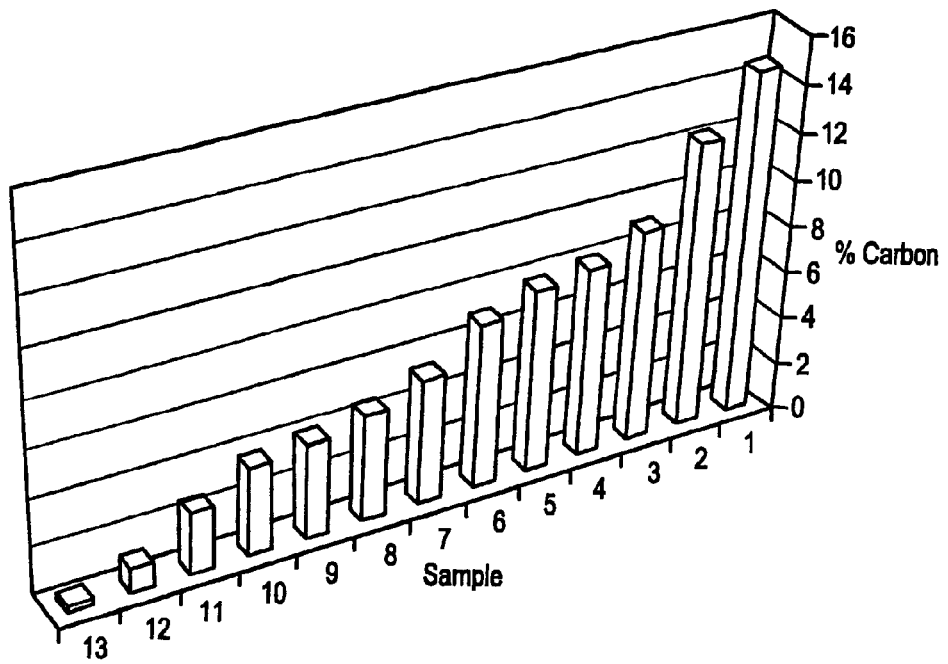
FIG. 9 is a graph of carbon percentages for thirteen fly ash samples.
Figure 10:
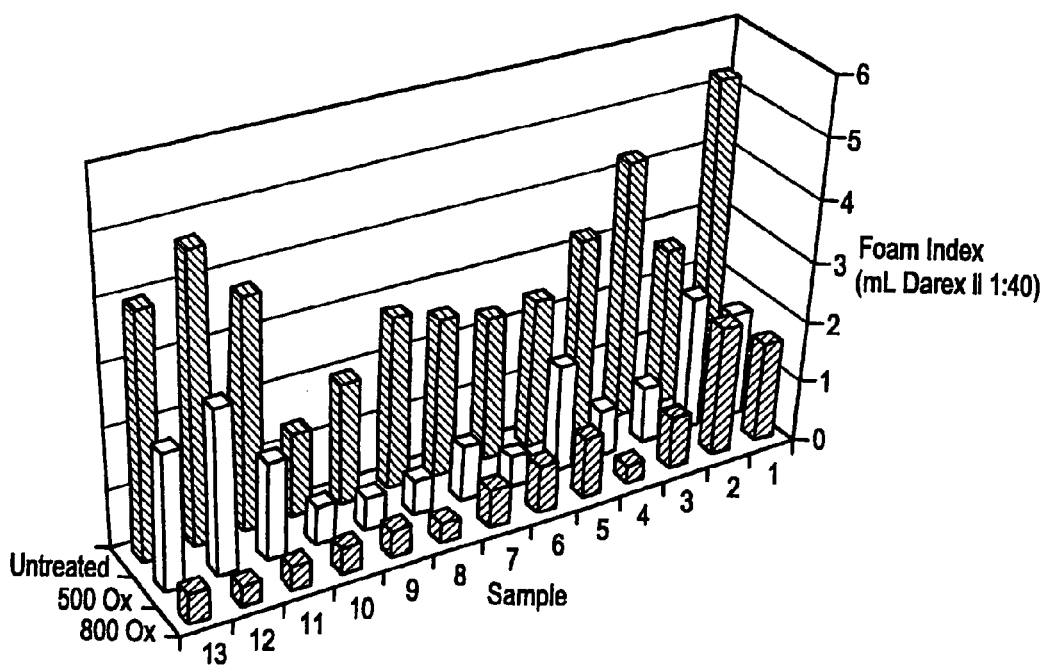
FIG. 10 is graph of comparisons between foam index values for untreated and oxidized fly ash samples.

In order to determine whether thermal treatments will have an effect on the FI of fly ashes in general, a series of thirteen fly ash samples of varying carbon content produced from eastern bituminous coals were selected and each was oxidized or pyrolyzed to about 500 and 800° C. followed by FI measurement on the residues. FIG. 9 shows the carbon content of each sample arranged from highest (Sample 1) to lowest (Sample 13) carbon content. FIG. 10 compares the FI of untreated fly ash samples to the values after thermal oxidation to about 500 and 800° C. Note that the FI measurements of the untreated fly ash samples do not correlate well with carbon content.

Three of the lower carbon fly ash samples have FI values exceeding those found in eight of the higher carbon fly ash samples. Clearly, as previously discussed, factors in addition to carbon content are affecting FI measurements. In every case, the FI of the oxidized fly ash samples are lower than the untreated samples. However, note that, in numerous cases, oxidation to about 800° C. (where all of the carbon has been oxidized) causes only a minimal decrease in FI compared with oxidation to 500° C. (where most of the carbon content is retained). It is interesting to note that in several cases where oxidation to about 800° C. does significantly decrease the FI values, the carbon content of the untreated fly ash is 2% or less. Changes in the fly ash inorganic components and/or changes in the properties of the carbon upon thermal treatment must be occurring that affect FI.

Figure 11:
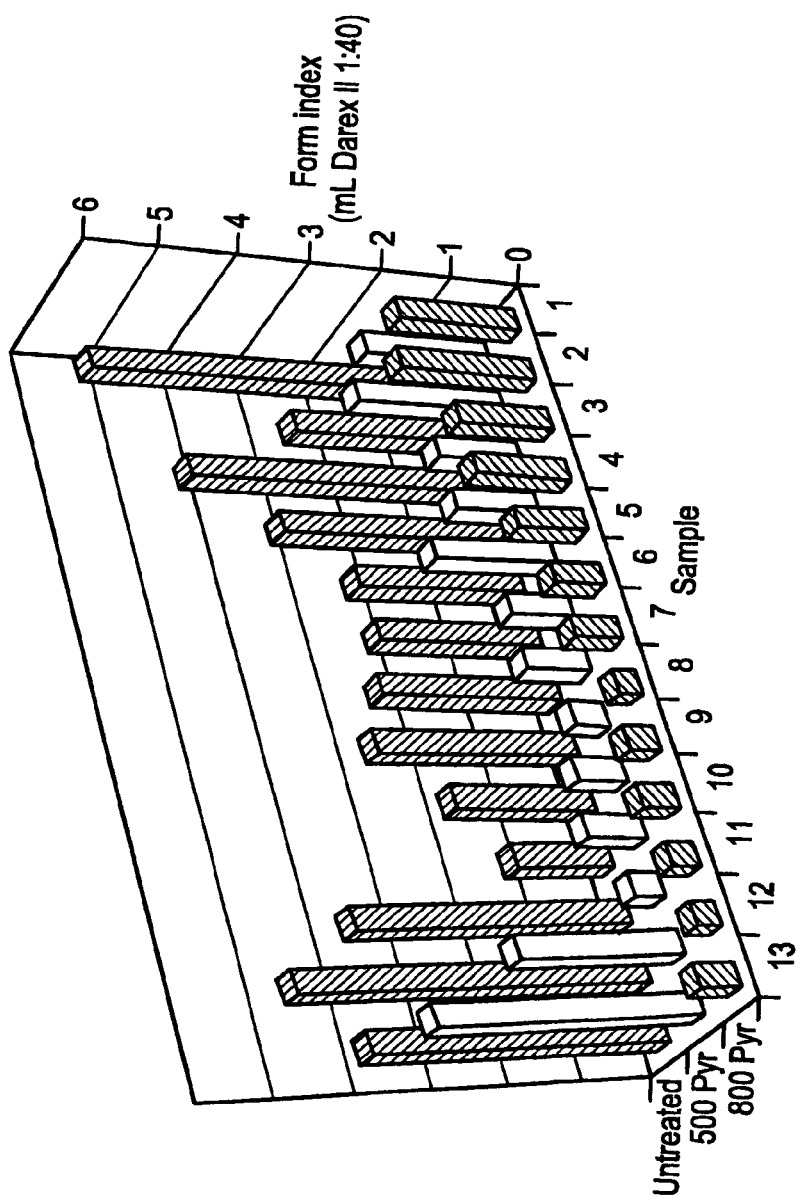
FIG. 11 is a graph of comparisons between foam index values for untreated and pyrolyzed samples of fly ash.

In order to minimize or remove changes in carbon content as a factor affecting the FI of fly ash samples thermally treated to about 500 and 800° C., the experiments described above were repeated under non-oxidative conditions. The results are shown in FIG. 11. In every case, thermal treatment to about 500° C. has decreased the FI compared to the untreated fly ash samples. For most of the fly ash samples, thermal treatment to 800° C. resulted in an additional small decrease in FI. However, low carbon fly ash samples 12 and 13 show a significant decrease in FI compared to the about 500° C. thermal treatment. Note also that, after thermal treatment to about 800° C., the fly ash residue FI values show a reasonably good correlation with carbon content.

Because Darex® II is an alkaline solution of fatty acid salts, and the surfactant properties of such "soaps" are affected by alkaline earth ions such as calcium and magnesium, it was decided to measure whether thermal treatment may affect the solubility of such ions in solution. Measuring the conductance of solutions exposed to the fly ashes helped to determine this. The conductance of a solution is affected by ions such as sodium and potassium in addition to calcium and magnesium. The interactions between alkali ions and AEAs are not as clear as that between the AEA and calcium and magnesium ions.

Conductance measurements were performed on the untreated fly ash samples and the fly ash residues recovered after pyrolysis to about 800° C. to determine the effects of thermal treatment on ion solubility. The results are shown in Table 3. Note that the conductance is lower in all cases after the thermal treatment. However, the magnitude of the decrease shows no apparent correlation with changes in FI. This may be due to the fact that Conductance is also affected by ions other than calcium and magnesium that have a lesser effect on the surfactant. Additionally, the thermal treatment does not render all of the calcium and magnesium insoluble. Heating the fly ash to about 800° C. does clearly lessen the solubility of ions that can interfere with the surfactant in the FI test, thus lowering the overall FI values. The ions that are rendered insoluble are probably incorporated into amorphous "glass-like" phases.

Up to this point, our experiments indicate that both unburned carbon and soluble ions such as calcium and magnesium have an impact on FI. If one considers the series of samples that were oxidized to about 800° C., it is apparent that after treatment at that temperature both carbon and soluble ions should have a negligible effect on FI. However in FIG. 10 it can be seen that some samples such as 1, 2, and 5 still have FI values greater than or equal to one. Some possible explanations for this observation are that not all of the alkaline earth elements have been tied up by thermal treatment to about 800° C. or that the structure of those particular fly ash residues is such that there are sites on the inorganic residue capable of adsorbing AEAs. We are currently examining the effects of treatment to higher temperatures and other possible modes of AEA adsorption.

While the invention has been described with reference to specific embodiments, modifications and variations of the invention may be constructed without departing from the scope of the invention, which is defined in the following claims.

TABLE 1

Summary of FlyAsh Concrete Test Results

| | | Fly Ash #1 | | | Fly Ash #2 | | | Fly Ash #3 | | |
|---|---|---|---|---|---|---|---|---|---|---|
| | | Unt. | 500 C. | 800 C. | Unt. | 500 C. | 800 C. | Unt. | 500 C. | 800 C. |
| A | Treatment | | | | | | | | | |
| B | Foam Index (mL) | 2.51 | 0.85 | 0.54 | 4.42 | 2.48 | 0.85 | 6.71 | 1.09 | 0.89 |
| C | Air Content % | 5.9 | 6.4 | 5.6 | 6.1 | 6.4 | 6.5 | 6.9 | 6.2 | 5 |
| D | Water/cy | 269 | 276 | 280 | 279 | 278 | 277 | 276 | 288 | 280 |
| E | Slump | 4.25 | 4.5 | 4.5 | 4.5 | 4 | 4.5 | 4.25 | 5 | 4.5 |
| F | 3-day psi | 2770 | 1750 | 2740 | 2580 | 2610 | 2360 | 2290 | 2450 | 2040 |
| G | 7-day psi | 3720 | 2550 | 3790 | 3600 | 3250 | 2990 | 3280 | 3370 | 3310 |
| H | 28-day psi | 4941 | 3565 | 5305 | 4688 | 4930 | 4379 | 4400 | 4030 | 4680 |

| | | Fly Ash #4 | | | Fly Ash #5 | | | Fly Ash #6 | | | Average, all series | | |
|---|---|---|---|---|---|---|---|---|---|---|---|---|---|
| | | Unt. | 500 C. | 800 C. | Unt. | 500 C. | 800 C. | Unt. | 500 C. | 800 C. | Unt. | 500 C. | 800 C. |
| A | Treatment | | | | | | | | | | | | |
| B | Foam Index (mL) | 2.24 | 0.88 | 0.58 | 6.15 | 3.39 | 1.29 | 2.71 | 1.41 | 0.8 | 4.12 | 1.68 | 0.83 |
| C | Air content | 6.2 | 6.5 | 6.1 | 4:9 | 3.8 | 4.7 | 5.5 | 5.9 | 6.5 | 5.92 | 5.87 | 5.73 |
| D | Water/cy | 278 | 277 | 278 | 295 | 307 | 294 | 287 | 286 | 2841 | 281 | 285 | 282 |
| E | Slump | 4 | 4.25 | 4 | 4.5 | 5 | 4.25 | 4.5 | 3.75 | 4 | 4.3 | 4.4 | 4.3 |
| F | 3-day psi | 2360 | 1880 | 2420 | 2320 | 2610 | 2230 | 2360 | 2130 | 2260 | 2447 | 2238 | 2342 |
| G | 7-day psi | 3470 | 3340 | 3370 | 3530 | 3690 | 3150 | 3600 | 3370 | 3250 | 3533 | 3262 | 3310 |
| H | 28-day psi | 4710 | 4680 | 4540 | 4640 | 4930 | 4700 | 4340 | 4600 | 4410 | 4620 | 4456 | 4669 |

TABLE 2

Conductance for Fly Ash Samples, Untreated and after Pyrolysis

| | Conductance, (μS/g ash) | Conductance, (μS/g ash) Pyrolysis to: | |
|---|---|---|---|
| Sample | Untreated | 500° C. | 800° C. |
| 1 | 160.1 | 127.5 | 113.6 |
| 2 | 127.5 | 99.5 | 84.7 |
| 3 | 125.0 | 118.6 | 70.7 |
| 4 | 163.8 | 108.6 | 84.2 |
| 5 | 73.5 | 58.0 | 21.7 |
| 6 | 175.9 | 141.9 | 135.8 |

TABLE 3

Conductance for 13 Fly Ash Samples, Untreated and after Pyrolysis to 800° C.

| Sample | Conductance, (μS/g ash) Untreated | Conductance, (μS/g ash) Pyrolysis |
|---|---|---|
| 1 | 42.5 | 16.0 |
| 2 | 56.2 | 38.4 |
| 3 | 53.0 | 20.5 |
| 4 | 65.1 | 26.1 |
| 5 | 63.3 | 43.3 |
| 6 | 78.3 | 33.4 |
| 7 | 223.0 | 208.0 |
| 8 | 108.8 | 76.0 |
| 9 | 171.0 | 131.9 |
| 10 | 191.7 | 153.1 |
| 11 | 95.4 | 70.6 |
| 12 | 103.4 | 60.1 |
| 13 | 1023.0 | 680.0 |

We claim:

1. A method of passivating fly ash comprising heating fly ash in the presence of an inert gas at a temperature range of between about 400° C. to 800° C., wherein the carbon in the fly ash is retained because of the presence of the inert gas.

2. The method of claim 1, wherein the passivating comprises passivating the carbon in the fly ash toward adsorption of surfactant.

3. The method of claim 2, wherein the passivating the carbon in the fly ash comprises passivating the carbon toward adsorption of air entrainment agent.

4. The method of claim 2, further comprising obtaining the fly ash from a furnace exhaust and passivating the carbon in the fly ash toward adsorption of air entrainment agent.

5. The method of claim 2, further comprising obtaining the fly ash from a furnace exhaust and passivating carbon in the fly ash toward adsorption of air entrainment agent.

6. The method of claim 1, further comprising obtaining the fly ash from a furnace exhaust and passivating the carbon in the fly ash toward adsorption of surfactant.

7. The method of claim 4, further comprising retaining the carbon content of the obtained fly ash after the passivating.

8. The method of claim 2, wherein the carbon content of the fly ash before the passivating is retained after the passivating.

9. The method comprising passivating fly ash toward absorption of a surfactant, wherein the passivating further comprises heating the fly ash in a mixture of 10% oxygen and an inert gas and retaining carbon in the fly ash.

10. The method comprising passivating fly ash toward absorption of a surfactant, wherein the passivating further comprises heating the fly ash in an inert gas and retaining carbon in the fly ash.

11. The method of claim 10, wherein no loss of carbon from the fly ash occurs during the passivating.

12. The method of claim 10, wherein the fly ash is passivated by heating the fly ash between about 400° C. and 800° C. in an inert gas.

13. The method of claim 10, wherein the fly ash is passivated by heating the fly ash between about 400° C. and 500° C. in an inert gas.

14. The method of claim 10, wherein the fly ash is passivated by heating the fly ash at about 500° C. in an inert gas.

15. A product produced by the method of claim 1, further comprising fly ash containing carbon passivated toward adsorption of surfactant.

16. The product produced by the method of claim 1, wherein the carbon contained in the fly ash is passivated toward adsorption of air entrainment agent.

17. The product produced by the method of claim 1, wherein the fly ash loses no significant amount of the carbon contained in the fly ash during the passivation.

18. The product produced by the product of claim 1, wherein the product contains the original carbon content of the fly ash before the passivation.

* * * * *